(12) United States Patent
Elmose

(10) Patent No.: US 11,946,450 B2
(45) Date of Patent: Apr. 2, 2024

(54) WIND TURBINE AND METHOD

(71) Applicant: Siemens Gamesa Renewable Energy A/S, Brande (DK)

(72) Inventor: Søren Forbech Elmose, Bording (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/952,355

(22) Filed: Nov. 19, 2020

(65) Prior Publication Data

US 2021/0164440 A1  Jun. 3, 2021

(30) Foreign Application Priority Data

Nov. 28, 2019 (EP) ..................... 19212309

(51) Int. Cl.
| | | |
|---|---|---|
| *F03D 7/02* | (2006.01) | |
| *F03D 7/04* | (2006.01) | |
| *F03D 80/70* | (2016.01) | |

(52) U.S. Cl.
CPC ............. *F03D 7/0224* (2013.01); *F03D 7/04* (2013.01); *F03D 80/70* (2016.05); *F05B 2240/211* (2013.01); *F05B 2240/50* (2013.01); *F05B 2260/80* (2013.01); *F05B 2270/80* (2013.01)

(58) Field of Classification Search
CPC ......... F03D 80/70; F03D 7/0224; F03D 17/00
See application file for complete search history.

(56) References Cited

U.S. PATENT DOCUMENTS

| | | | | |
|---|---|---|---|---|
| 9,133,827 | B2* | 9/2015 | Bauer | F16C 19/52 |
| 9,541,128 | B2* | 1/2017 | Erskine | G01M 3/24 |
| 10,324,003 | B2* | 6/2019 | Thomson | G01M 13/045 |
| 11,460,005 | B2* | 10/2022 | Haseba | G01H 1/003 |
| 2013/0028736 | A1 | 1/2013 | Bauer et al. | |
| 2013/0034439 | A1 | 2/2013 | Bauer et al. | |

(Continued)

FOREIGN PATENT DOCUMENTS

| | | |
|---|---|---|
| CN | 102635513 A | 8/2012 |
| CN | 102900628 A | 1/2013 |

(Continued)

OTHER PUBLICATIONS

European Search Report dated May 14, 2020 for application No. 19212309.9.

*Primary Examiner* — Justin D Seabe
(74) *Attorney, Agent, or Firm* — Schmeiser, Olsen & Watts LLP

(57) ABSTRACT

A wind turbine is provided, including a hub, rotor blades, wherein each rotor blade is rotatably supported at or in the hub by a pitch bearing, a pitch control device for changing a pitch angle of the rotor blades, and a measurement system for capturing a sensor signal in or at the pitch bearing and for changing the pitch angle by the pitch control device as a function of the sensor signal to prevent failure of the pitch bearing due to a lack of lubrication, wherein the sensor signal represents a change in vibration, noise and/or temperature in or at the pitch bearing. Due to the fact that the pitch angle can be changed as a function of the sensor signal, lubrication of the pitch bearing is ensured throughout the lifetime of the pitch bearing. Unnecessary pitch movements can be prevented.

10 Claims, 3 Drawing Sheets

(56) References Cited

U.S. PATENT DOCUMENTS

| | | | |
|---|---|---|---|
| 2014/0017081 A1* | 1/2014 | Esbensen | F03D 7/043 |
| | | | 416/1 |
| 2014/0070789 A1* | 3/2014 | Nieuwenhuizen | F03D 17/00 |
| | | | 324/71.1 |
| 2016/0334303 A1 | 11/2016 | Thomson et al. | |
| 2019/0211805 A1 | 7/2019 | Elmose et al. | |

FOREIGN PATENT DOCUMENTS

| | | |
|---|---|---|
| CN | 110030164 A | 7/2019 |
| DE | 102012200777 A1 | 7/2013 |
| DE | 102015218659 A1 | 3/2017 |
| EP | 2484900 A1 | 8/2012 |
| EP | 2574775 B1 | 6/2014 |

* cited by examiner

WIND TURBINE AND METHOD

CROSS-REFERENCE TO RELATED APPLICATIONS

This application claims priority to European Application No. 19212309.9, having a filing date of Nov. 28, 2019, the entire contents of which are hereby incorporated by reference.

FIELD OF TECHNOLOGY

The following relates to a wind turbine and to a method for preventing failure of a pitch bearing of a rotor blade of the wind turbine.

BACKGROUND

Modern wind turbine rotor blades are built from fiber-reinforced plastics. A rotor blade typically comprises an airfoil having a rounded leading edge and a sharp trailing edge. The rotor blade is connected with its blade root to a hub of the wind turbine. The hub is supported in a nacelle and the nacelle is attached to an end of a tower of the wind turbine. The rotor blades are supported at or in the hub by pitch bearings. The pitch bearings, a pitch angle of the rotor blades can be changed.

During long periods of operation, the power needs not to be adjusted by pitching the rotor blade. This means that the pitch bearing will be static. During this period, the load on the rotor blade will be highly dynamic which can cause false brinelling and fretting corrosion on the raceway of the pitch bearing unless the pitch bearing is moved to a new location which allows lubricant to get onto the contact surface. Accordingly, stand still marks can occur after a given time period. This time period will depend on many factors like load level, temperature, lubrication condition, water content and so on.

To avoid this issue, the pitch bearing can be pitched with a certain pattern which has proven to remove the risk completely under all circumstances and/or running conditions. This pattern is based on experience and tests. However, when the rotor blade is pitched away from the optimal power position, there will be a loss of energy. This has to be avoided.

SUMMARY

An aspect relates to providing an improved wind turbine.

Accordingly, a wind turbine is provided. The wind turbine comprises a hub, rotor blades, wherein each rotor blade is rotatably supported at or in the hub by a pitch bearing, a pitch control device for changing a pitch angle of the rotor blades, and a measurement system for capturing a sensor signal in or at the pitch bearing and for changing the pitch angle by the pitch control device as a function of the sensor signal to prevent failure of the pitch bearing due to a lack of lubrication, wherein the sensor signal represents a change in vibration, noise and/or temperature in or at the pitch bearing.

Due to the fact that the pitch angle can be changed as a function of the sensor signal, lubrication of the pitch bearing is ensured throughout the lifespan of the pitch bearing. Unnecessary pitch movements can be prevented. This reduces energy loss. Also, damage of the pitch bearing due to a lack of lubrication can be prevented.

The hub is rotatably supported at a nacelle of the wind turbine. The number of rotor blades is arbitrary. For example, there are provided three rotor blades. The pitch bearing is part of the wind turbine. Each rotor blade has a pitch bearing. The pitch angle is an angle that is changed when the rotor blade is rotated around a middle axis of the pitch bearing. The pitch angles of the rotor blades can be changed independently. The pitch bearing can be a rolling bearing, a ball bearing or a plain bearing. Any bearing can be used.

The pitch control device can comprise an actuator to pitch the rotor blades. Each rotor blade can have its own actuator. The actuator can be an electric or hydraulic motor. "Capturing" the sensor signal in this context means that the measurement system is capable of generating the sensor signal by one sensor or a plurality of sensors. Changing the pitch angle as a "function" of the sensor signal in this context means that the pitch angle is changed when the sensor signal changes when the sensor signal indicates that vibration, noise, temperature and/or another suitable parameter in or at the pitch bearing changes, and/or increases. "Vibration" includes oscillations and vibrations. "Noise" or "sound" can also include oscillations and vibrations, audible oscillations and vibrations.

The sensor signal is preferably an indirect sensor signal. "Indirect" in this context means that not the lubrication itself is measured, but the consequences of a weak lubrication, namely a change in vibration, noise and/or temperature. In contrast to that can be seen direct sensor signals. "Direct" in this context means that the lubrication itself is qualified. This can for example be done by measuring capacitance and/or resistance of the pitch bearing. Accordingly, any other indirect sensor signal can also be used to evaluate the status of the pitch bearing. Preferably, indirect sensor signals are used. However, direct sensor signals are not excluded and can also be used, but are less preferred. No measurement method is excluded.

"Failure" in this context includes stand still marks, false brinelling and fretting corrosion on the raceway of the pitch bearing and/or any other potential damage of the pitch bearing that can be caused by weak lubrication. In particular, "failure" includes stand still failure.

According to an embodiment, the measurement system comprises a controller and at least one sensor which is coupled to the controller.

The number of sensors is arbitrary. For example, each rotor blade and/or each pitch bearing comprises one or more sensors. The sensors can comprise temperature sensors, sound transducers or the like.

According to a further embodiment, the sensor is arranged in or at the hub and/or the sensor is arranged in or at the blades.

The sensor can also be arranged in or at the pitch bearing. The hub can have a plurality of sensors. Also, each blade can have one sensor or more than one sensor.

According to a further embodiment, the wind turbine further comprises a memory that is coupled to the controller, wherein the sensor signal is stored in the memory.

Threshold values can be stored in the memory. The sensor signal can be compared with the threshold values. When the sensor signal significantly deviates from the threshold values, the pitch angle can be changed, for example.

According to a further embodiment, the measurement system compares the sensor signal to an initial level and/or an initial pattern of the sensor signal, wherein when a final level and/or a final pattern of the sensor signal deviates from the initial level and/or the initial pattern, the pitch control device is controlled to change the pitch angle.

"Initial" in this context means a sensor signal which is captured under normal operation conditions. This means, when no pitch movement is needed. "Final" in this context means a sensor signal which is captured under critical operation conditions. This means, when a pitch movement is needed to prevent damage of the pitch bearing due to weak lubrication. A "pattern" in this context means the progress of the sensor signal over a predetermined time slot. Hence, the "pattern" can be a curve displaying the sensor signal over time.

Furthermore, a method for preventing failure of a pitch bearing of a rotor blade of a wind turbine due to a lack of lubrication is provided. The method comprises the steps of: a) capturing a sensor signal in or at the pitch bearing by a measurement system, wherein the sensor signal represents a change in vibration, noise and/or temperature in or at the pitch bearing, and b) changing the pitch angle by a pitch control device as a function of the sensor signal to prevent failure of the pitch bearing due to a lack of lubrication.

In step b), the pitch angle is changed when the sensor signal indicates that the lubrication is weak. This can result in an increase in vibration, noise and/or temperature.

According to an embodiment, in or before step b), the sensor signal is compared with an initial level and/or an initial pattern of the sensor signal, wherein the pitch angle is changed by the pitch control device when a final level and/or a final pattern deviates from the initial level and/or the initial pattern.

"Deviate" in this context means that the final level and/or the final pattern has a significantly different value than the initial level and/or the initial pattern. "Significantly different" in this context can mean that the value of the final level and/or the final pattern differs from the initial level and/or the initial pattern in a distinctive factor. This factor can for example be 0.5 to 5 or the like. The factor can be chosen as needed. "Initial" in this context means a sensor signal which is captured under normal operation conditions. This means, when no pitch movement is needed.

"Final" in this context means a sensor signal which is captured under critical operation conditions. This means, when a pitch movement is needed to prevent damage of the pitch bearing due to weak lubrication. A "pattern" in this context means the progress of the sensor signal over a predetermined time slot. Hence, the "pattern" can be a curve displaying the sensor signal over time.

According to a further embodiment, the pitch angle is changed when the final level and/or the final pattern is higher than the initial level and/or the initial pattern.

"Higher" in this context means that the final level has a higher value that the initial level. The pitch angle can also be changed when the final level and/or the final pattern is lower than the initial level and/or the initial pattern. "Lower" in this context means that the final level has a smaller value that the initial level.

According to a further embodiment, the level and/or pattern are measured throughout the operation of the wind turbine.

In this way, a continuous control of the pitch bearing over the lifetime thereof is possible.

According to a further embodiment, the pattern is a function of the sensor signal over time.

For example, the pattern is a function of the oscillation in Hertz over the time in milliseconds. However, the pattern can also be a function of the temperature in Degree Celsius over the time in milliseconds.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with references to the following Figures, wherein like designations denote like members, wherein.

DETAILED DESCRIPTION

Figure 1:
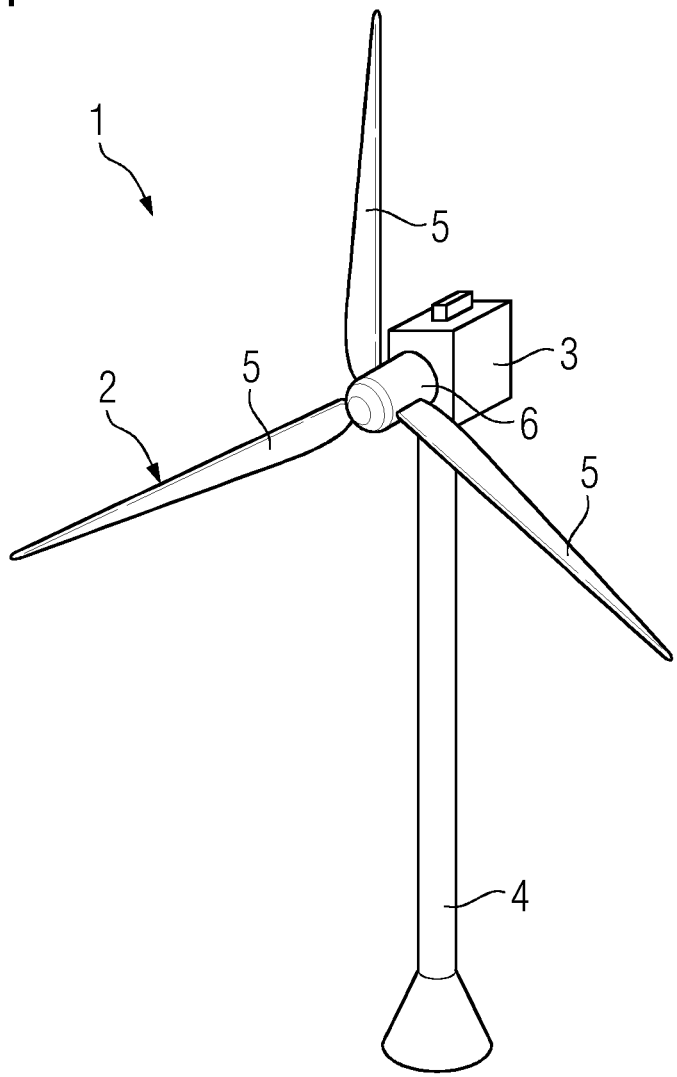
FIG. 1 shows a perspective view of a wind turbine according to one embodiment.

FIG. 1 shows a wind turbine 1 according to one embodiment.

The wind turbine 1 comprises a rotor 2 connected to a generator (not shown) arranged inside a nacelle 3. The nacelle 3 is arranged at the upper end of a tower 4 of the wind turbine 1. The tower 4 has a plurality of tower sections that are arranged on top of each other. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
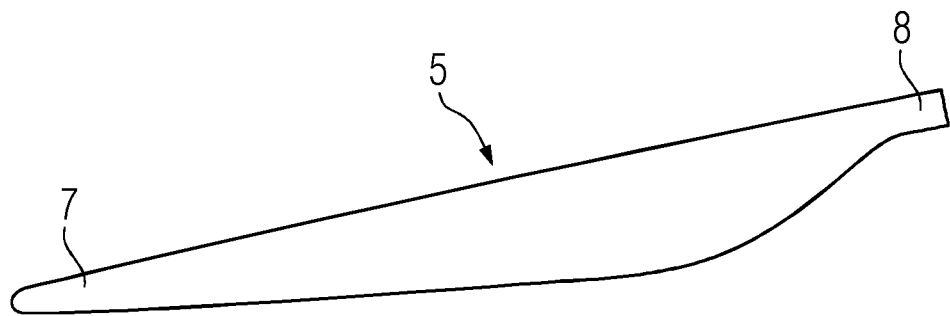
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
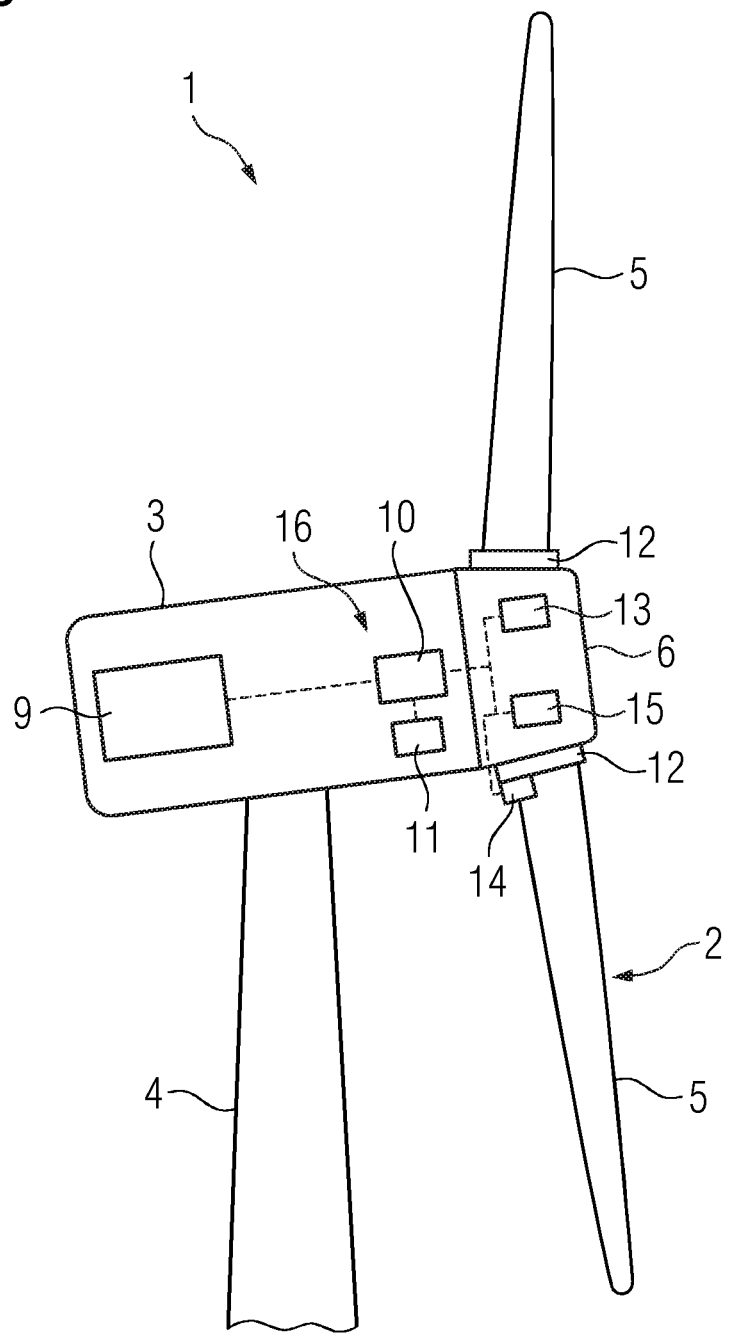
FIG. 3 shows a cross-sectional view of the wind turbine according to FIG. 1.

FIG. 3 shows a cross-sectional view of the wind turbine 1.

As can be seen from FIG. 3, the nacelle 3 encases a generator 9 that is coupled to the rotor 2 to transfer the wind energy into electric energy. The nacelle 3 also encases a controller 10 and a memory 11. The controller 10 is coupled to the generator 9. Control of the power output of the wind turbine 1 requires the possibility to rotate the rotor blades 5. Therefore, each rotor blades 5 is supported by a blade bearing or pitch bearing 12 connecting the blade root 8 of the rotor blade 5 to the hub 6. In the following only one rotor blade 5 will be referred to.

The pitching of the rotor blade 5 is done by a pitch control device 13. The pitch control device 13 can be part of the hub 6 and/or can be arranged inside the hub 6. The pitch control device 13 can have an electric or hydraulic motor to pitch the rotor blade 5. The pitch control device 13 is coupled to the controller 10.

During long periods of operation, the power needs not to be adjusted by pitching the rotor blade 5. This means that the pitch bearing 12 will be static. During this period, the load on the rotor blade 5 will be highly dynamic which can cause false brinelling and fretting corrosion on the raceway of the pitch bearing 12 unless the pitch bearing 12 is moved to a new location which allows lubricant to get onto the contact surface. Accordingly, stand still marks can occur after a given time period. This time period will depend on many factors like load level, temperature, lubrication condition, water content and so on.

To avoid this issue, the pitch bearing 12 can be pitched with a certain pattern which has proven to remove the risk completely under all circumstances and/or running conditions. This pattern is based on experience and tests. However, when the rotor blade 5 is pitched away from the optimal power position, there will be a loss of energy. This has to be avoided.

Accordingly, the wind turbine 1 has one or more sensors 14, 15 sensing vibration and/or noise(sound) from one or more pitch bearings 12. For example, the sensor 14 is arranged at or inside the pitch bearing 12 or at or inside the rotor blade 5. The sensor 15 can be placed inside the hub 6. The number of sensors 14, 15 is arbitrary. Each rotor blade 5 and/or each pitch bearing 12 can comprise several sensors 14, 15. The sensors 14, 15 are in communication with the controller 10 and the pitch control device 13. The data received by the controller 10 is stored in the memory 11. As shown in FIG. 3, the controller 10 may also be in communication with the generator 9.

The controller 10 together with the sensors 14, 15 forms a measurement system 16 which is suitable for determining when a pitch movement of the rotor blade 5 or the pitch bearing 12 is required to avoid stand still issues. In this way, the pitch cycle strategy can go to the limit and thereby energy loss can be minimized. In other words, the amount of pitching can be reduced. The measurement system 16 initiates a pitching movement based on the sensor signals from the sensors 14, 15. Unnecessary pitching is avoided.

This may for example be done by measuring, by one or more sensors 14, 15, specific vibration and/or sound and/or noise curves and/or patterns and/or levels (e.g. mean values or similar) of the pitch bearing 12 during operation of the wind turbine 1. Hence, when the vibration and/or sound and/or noise curves and/or patterns and/or levels of the pitch bearing 12 reach one or more specific curves and/or patterns and/or levels, the pitch bearing 12 is activated by the pitch control device 13 and moved to a chosen pitch angle, whereby the pitch bearing 12 is lubricated.

Any movements and/or vibrations and/or sound and/or noise from the rotating hub 6 with the rotor blades 5 and/or related movements and/or vibrations of the tower 4 and/or sound and/or noise of other mechanical induced movements and/or vibrations and/or sound and/or noise from the wind turbine 1, e.g. from a gear or the generator 9, may be reflected in the pitch bearing 12. Depending on the level of lubrication inside the pitch bearing 12 and/or when false brinelling or fretting corrosion has occurred or is just about to occur, the pitch bearing 12 may vibrate and/or make a sound and/or noise in one or more specific curves and/or patterns and/or having specific levels.

In a further example of an embodiment of the wind turbine 1, besides movements and/or vibrations and/or sound and/or noise sensor measurements, the sensor measurements may also comprise temperature measurements of the pitch bearing 12. Preferably, local temperature changes close to the raceway of the pitch bearing 12 are measured and/or monitored. These temperature changes may occur when the contact zone is no longer lubricated and more frictional energy is therefore deposited into the contact zone as heat. This may be done by one or more sensors 14, 15 placed in or near the raceway and/or by a sensor in a ball or roller of the pitch bearing 12.

Alternatively, besides measuring levels and/or curves and/or patterns, also peak, local maximum, values of the specific measuring signals may be measured to give an indication if stand still marks is about to happen or has happened and the controller 10 may thereby activate the pitch control device 13 to make the rotor blade 5 pitch or move to a specific angle to ensure lubrication in the pitch bearing 12.

Figure 4:
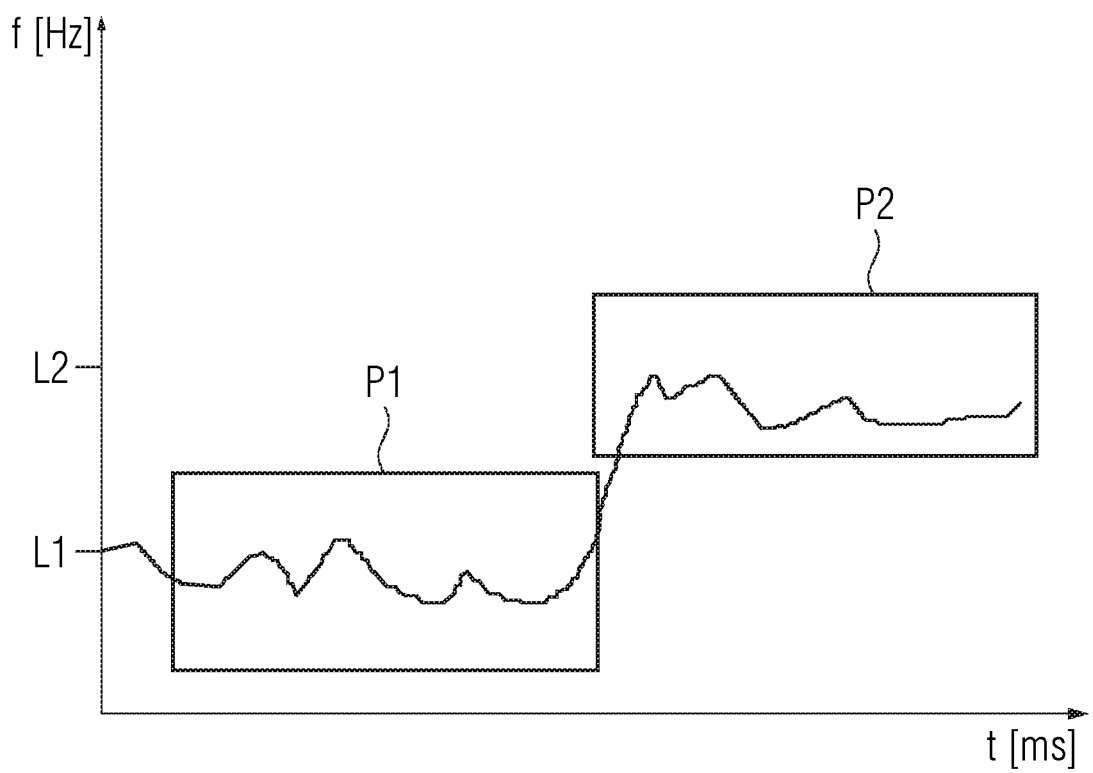
FIG. 4 shows a diagram displaying a sensor signal over time.

FIG. 4 shows a diagram where a sensor signal f, the frequency in Hertz [Hz], is displayed over time t in milliseconds [ms].

As can be seen from FIG. 4, different levels L1, L2 and/or different patterns P1, P2 are measured and evaluated by the measurement system 16 indicating a specific level of lubrication inside the pitch bearing 12 and/or that false brinelling or fretting corrosion has occurred or is just about to occur in the pitch bearing 12. A "pattern" in this context means the progress of the sensor signal f over a predetermined time slot. Hence, the "pattern" is a curve.

For example, a pitching movement can be necessary when the sensor signal f increases from level L1 to level L2 and/or when pattern P1 of the sensor signal f switches to pattern P2 of the sensor signal f. L1 and P1 indicate normal operation conditions, whereas L2 and P2 indicate the need for a pitch movement. Any radical change in the level L1 and/or the pattern P1 can require a pitch movement.

In FIG. 4, the sensor signal f means measured frequency and/or vibration levels L1, L2 and/or patterns P1, P2 or curves. However, the sensor signal f could as well be sound and/or noise and/or temperature levels and patterns or curves. When the specific level L2 or pattern P2 or curve is evaluated by the controller 10 as being critical, that means low lubrication and/or false brinelling or fretting corrosion indication or similar, the pitch bearing 12 may be activated by the pitch control device 13 and moved for a specific pitch angle. This pitch angle can be 1° or more or less.

Some degree of pitch activity is needed to avoid stand still issues. Therefore, the full potential of savings will not be achievable. However, the pitching could be reduced to a minimum, which would release some additional energy production.

Figure 5:
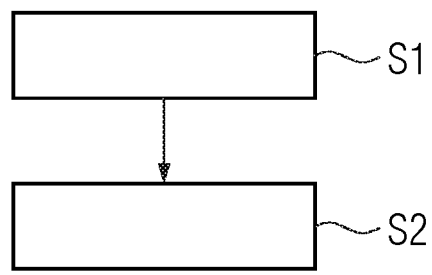
FIG. 5 shows a block diagram of one embodiment of a method for preventing failure of a pitch bearing of the rotor blade according to FIG. 2.

FIG. 5 shows a block diagram of one embodiment of a method for preventing failure of the pitch bearing 12.

"Failure" in this context includes stand still marks, false brinelling and fretting corrosion on the raceway of the pitch bearing 12 and/or any other potential damage of the pitch bearing 12 that can be caused by weak lubrication. In particular, "failure" includes stand still failure.

In an initial step S1, the sensor signal f is captured in or at the pitch bearing 12 by the measurement system 16. The sensor signal f represents a change in vibration, noise and/or temperature in or at the pitch bearing 12. In a step S2, the pitch angle is changed by the pitch control device 13 as a function of the sensor signal f to prevent failure of the pitch bearing 12 by reason of a lack of lubrication.

In or before step S2, the sensor signal f is compared with an initial level L1 and/or an initial pattern P1 of the sensor signal f, wherein the pitch angle is changed by the pitch control device 13 when a final level L2 and/or a final pattern P2 deviates from the initial level L1 and/or the initial pattern L1. "Initial" in this context means a sensor signal f which is captured under normal operation conditions. This means, when no pitch movement is needed. "Final" in this context means a sensor signal f which is captured under critical operation conditions. This means, when a pitch movement is needed to prevent damage of the pitch bearing 12.

The pitch angle is changed when the final level L2 and/or the final pattern P2 is higher than the initial level L1 and/or the initial pattern P1. "Higher" in this context means that the final level L2 has a higher value that the initial level L1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind turbine, comprising:
a hub;
rotor blades, wherein each rotor blade is rotatably supported at or in the hub by a pitch bearing;
a pitch control device for changing a pitch angle of the rotor blades; and
a measurement system comprising a controller and a plurality of sensors coupled to the controller, the plurality of sensors configured to capture sensor signals in or at the pitch bearing and for changing the pitch angle by the pitch control device as a function of the sensor signals to prevent failures of the pitch bearing due to a lack of lubrication, wherein the sensor signals represents a change in vibration from the pitch bearing that is caused by the lack of lubrication between contact surfaces of the pitch bearing, during operation of the wind turbine;
wherein the measurement system compares the sensor signals to an initial pattern of the sensor signals captured under normal operating conditions, and when a final pattern of the sensor signals deviates from the initial pattern, the pitch control device is controlled to change the pitch angle, the final pattern comprising a continuous progress of the sensor signals over a predetermined time;
wherein the plurality of sensors include at least one sensor arranged in or at the hub and at least one sensor arranged in or at the rotor blades.

2. The wind turbine according to claim 1, further comprising a memory that is coupled to the controller, wherein the sensor signals are stored in a memory.

3. The wind turbine according to claim 1, wherein the sensor signals are continuously captured throughout operation of the wind turbine.

4. The wind turbine according to claim 1, wherein the sensor signal also represents a change in temperature in or at the pitch bearing.

5. A method for preventing failures of a pitch bearing of a rotor blade of a wind turbine due to a lack of lubrication, of the method comprising:
a) capturing sensor signals of a plurality of sensors in or at the pitch bearing by a measurement system, wherein the sensor signals represents a change in vibration from the pitch bearing that is caused by the lack of lubrication between contact surfaces of the pitch bearing, during operation of the wind turbine, and
b) changing the pitch angle by a pitch control device as a function of the sensor signals to prevent failure of the pitch bearing due to a lack of lubrication;
wherein in or before step b), the sensor signals are compared with an initial pattern of the sensor signals captured under normal operating conditions, and wherein the pitch angle is changed by the pitch control device when a final pattern deviates from the initial pattern, the final pattern comprising a continuous progress of the sensor signal over a predetermined time;
wherein the plurality of sensors include at least one sensor arranged in or at the hub and at least one sensor arranged in or at the rotor blades.

6. The method according to claim 5, wherein the pitch angle is changed when the final level and/or the final pattern is higher than the initial level and/or the initial pattern.

7. The method according to claim 5, wherein the level and/or the pattern are measured throughout the operation of the wind turbine.

8. The method according to claim 5, wherein the pattern is a function of the sensor signals over time.

9. The method according to claim 5, wherein the sensor signals are continuously captured throughout operation of the wind turbine.

10. The method according to claim 5, wherein the sensor signals also represent a change in temperature in or at the pitch bearing.

* * * * *